United States Patent [19]

Hoppie

[11] 4,246,988
[45] Jan. 27, 1981

[54] REGENERATIVE BRAKING SYSTEM

[75] Inventor: Lyle O. Hoppie, Birmingham, Mich.

[73] Assignee: Eaton Corporation, Cleveland, Ohio

[21] Appl. No.: 944,442

[22] Filed: Sep. 21, 1978

[51] Int. Cl.³ .................. F16D 67/06; B60K 41/24
[52] U.S. Cl. ............................... 192/2; 192/4 A;
 192/9; 180/54 R; 185/40 H
[58] Field of Search .............. 192/1, 17 C, 2, 9, 3 TR,
 192/0.094, 4 A, 0.049; 180/54 R, 165; 185/40
 H, 9, 10, 11, 37; 74/751

[56] References Cited

U.S. PATENT DOCUMENTS

| 3,126,070 | 3/1964 | Hayek | 185/37 |
|---|---|---|---|
| 3,589,464 | 6/1971 | Katcharakoff | 180/54 R |
| 3,734,222 | 5/1973 | Bardwick | 74/751 X |
| 4,098,144 | 7/1978 | Besel et al. | 180/54 R |
| 4,132,283 | 1/1979 | McCurry | 192/3 R |
| 4,159,042 | 6/1979 | Jayner | 185/40 H |

Primary Examiner—George H. Krizmanich
Attorney, Agent, or Firm—R. J. McCloskey; D. Wood;
P. S. Rulon

[57] ABSTRACT

Disclosed is a regenerative braking system for an automotive vehicle. The system includes a regenerative braking device and an electronic control therefor. The regenerative device includes a transmission assembly and an energy storage assembly. The transmission assembly includes first and second power paths operative, respectively, when actuated to effect the flow of energy to and from the storage assembly. The storage assembly includes a plurality of cylindrical rubber bars which are torsionally stressed via the first path during vehicle braking and drained of the torsional stress via the second path during vehicle acceleration. The control includes means for preventing simultaneous transmission of braking and driving signals, means to modulate the actuation duty cycle of the first path for controlling braking torque provided by the storage assembly, means to modulate the actuation duty cycle of the second path for controlling the driving torque provided by the storage assembly, means to actuate the vehicle wheel brakes when the storage assembly cannot provide the braking torque demanded, and means to actuate the vehicle prime mover when the storage cannot provide the driving torque demanded.

23 Claims, 3 Drawing Figures

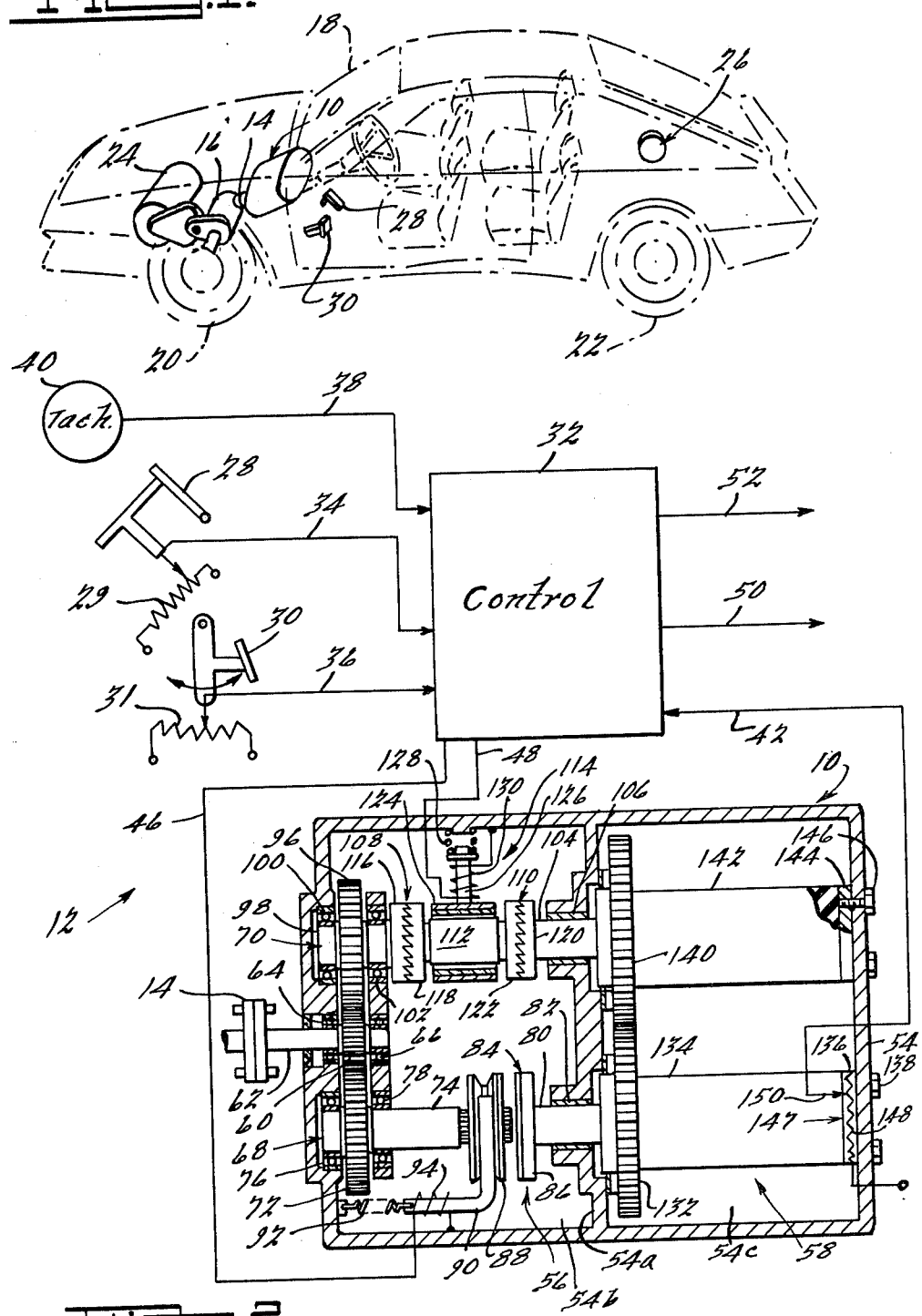

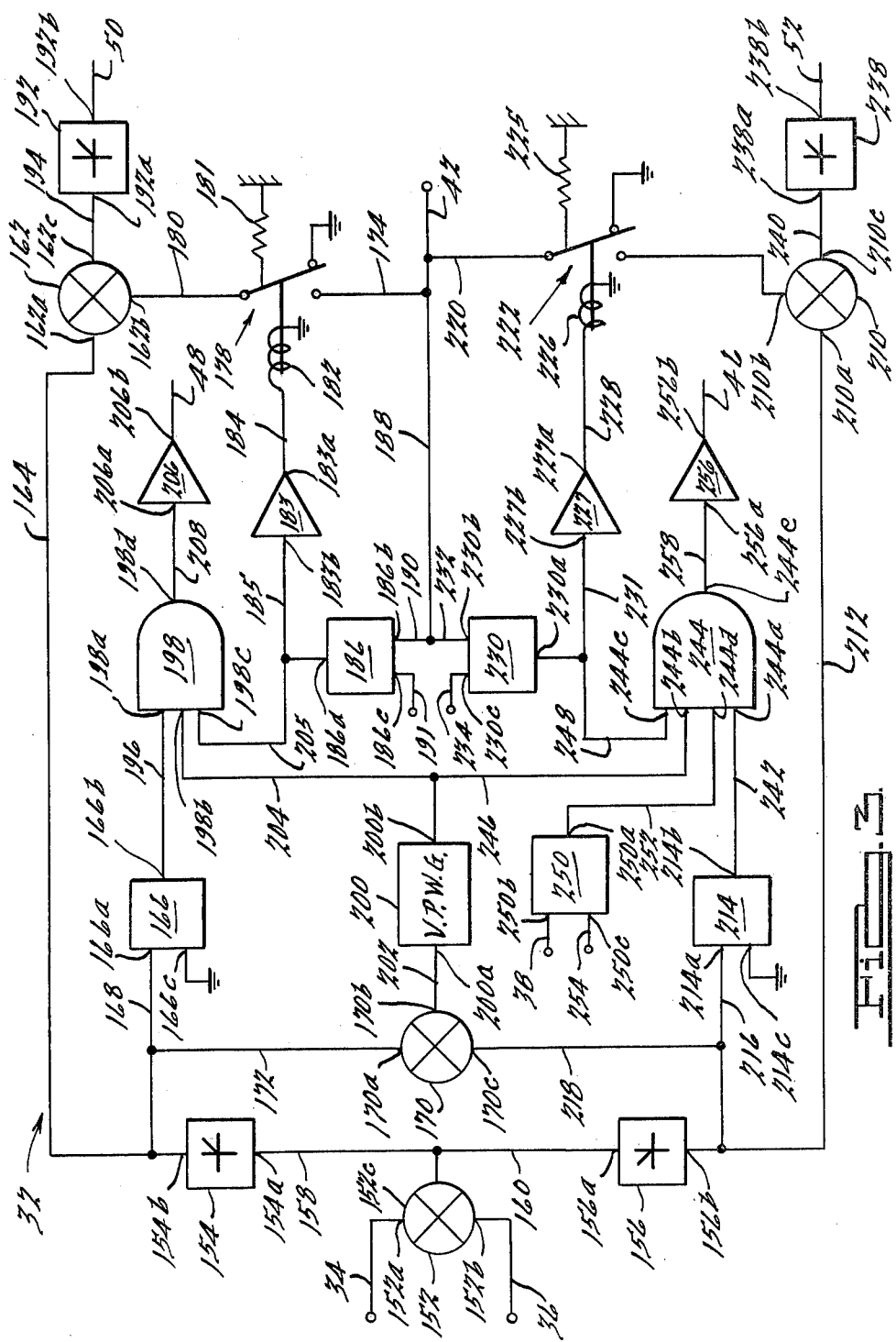

REGENERATIVE BRAKING SYSTEM

FIELD OF THE INVENTION

This invention relates to regenerative braking and more specifically to regenerative braking of an automotive vehicle and the automatic control of the regenerative braking.

BACKGROUND OF THE INVENTION

Automotive regenerative braking systems having storage assemblies employing metal springs are well known. Such systems have been manually operated to effect vehicle braking by converting vehicle motion energy (kinetic energy) into resiliently stored potential energy and manually operated to effect vehicle acceleration with the stored energy. The storage assemblies employing metal springs have been unduly bulky and/or heavy. Further, the amount of braking and driving torque provided by such storage assemblies has not been readily controllable. Still further, the controls for such devices have not readily provided for an automatic or smooth transition from regenerative braking and driving to regular wheel braking and prime mover driving.

SUMMARY OF THE INVENTION

An object of this invention is to provide a regenerative braking assembly having a high energy storage level per unit weight and volume.

Another object of the invention is to provide a control for a regenerative braking device which automatically controls the device in response to driving and braking torque signals.

Another object of this invention is to provide a regenerative braking system having means to resiliently store energy and a control for automatically regulating the amount of braking and driving torque provided by the resilient means.

Another object of this invention is to provide a regenerative braking system control which automatically and smoothly transitions from regenerative braking and driving to regular wheel braking and prime mover driving.

These and other objects are met by the disclosed regenerative braking system.

According to a feature of the invention, the regenerative braking system is adapted for installation in a machine (such as a vehicle) including driven means (such as the vehicle drive train and wheels) powered by a prime mover activated by a driving torque signal and stopped by brake means activated by a braking torque signal; the system includes first and second means adapted for driving connection with the driven means and operative, respectively, when actuated to effect a driving connection with the driven means, resilient energy storage means operative when motion of the driven means is to be braked and in response to actuation of the first means to receive and resiliently store energy from the driven means, and operative when the driven means is to be moved and in response to actuation of the second means to transmit and resiliently return the stored energy to the driven means, and control means adapted to receive the driving the braking torque signals and operative in response to such signal to, respectively, actuate the second and first means.

According to a further feature of the invention, the control means includes means automatically operative to regulate the actuation duty cycle of the first and second means in response to the values of the driving and braking torque signals for governing, respectively, the driving and braking torque provided by the resilient means.

According to a further feature of the invention, the resilient means is an elastomeric means operative to resiliently store the energy in response to actuation of the first means and operative to transmit the stored energy in response to actuation of the second means.

According to a further feature of the invention, the control means includes means automatically operative to activate the brake means when the resilient means is unable to provide the braking torque demanded by the braking torque signal.

According to a further feature of the invention, the control means includes means automatically operative to activate the prime mover when the resilient means is unable to provide the driving torque demanded by the driving torque signal.

According to a further feature of the invention, the control means includes means automatically operative to activate the brake means and prevent actuation of the first means in response to a braking torque signal when motion of the driven means is below a predetermined minimum.

These and other features of the invention are disclosed and claimed in the following specification.

BRIEF DESCRIPTION OF THE DRAWINGS

The preferred embodiment of the invention is shown in the accompanying drawings in which:

FIG. 1 shows the regenerative braking device installed in a vehicle;

FIG. 2 schematically shows the regenerative braking device of FIG. 1 and the control therefor; and FIG. 3 shows the circuitry of the control in FIG. 2.

Certain terminology referring to direction and motion will be used in the following description. The terminology is for convenience in describing the disclosed embodiment and should not be considered limiting unless explicitly used in the claims.

DETAILED DESCRIPTION OF THE DRAWINGS

Referring now to FIG. 1, therein is shown a regenerative braking device 10 according to the regenerative braking system 12 shown in FIG. 2. The regenerative braking device 10 is connected via a coupling 14 into a drive train 16 of an automotive vehicle 18 having front and rear wheels 20 and 22, a prime mover 24 drivingly connected to the front wheels via the drive train, wheel brakes 26 associated with each of the wheels, an accelerator pedal 28 for producing a driving torque signal, and a brake pedal 30 for producing a braking torque signal. The vehicle shown herein is by way of example only. For example, prime mover 24, which is shown as an electric motor, may be any type of torque producing device, the prime mover may drive the front and/or the rear wheels, and the accelerator and brake pedals may be separate or combined. Further, the regenerative braking device 10 and the prime mover need not be connected to the same wheels.

Looking now at FIG. 2, the regenerative braking system 12 includes a control 32 operative to receive driving and braking torque signals via leads 34 and 36 from the accelerator and brake pedals 28 and 30, a vehicle speed signal via a lead 38 from a tachometer 40, and a torsion level signal indicating the amount of energy stored in device 10 via a lead 42. The driving and braking torque signals, the vehicle speed signal, and the torsion level signal are positive going analog signals. However, all or part of the signals could be negative going or digital by merely selecting the appropriate circuitry. Control 32 is also operative in response to the received signals to provide signals via leads 46 and 48 for actuating device 10 between energy storing and transmitting modes of operation and to provide signals via leads 50 and 52 for activating the prime mover and wheel brakes.

The accelerator and brake pedals 28 and 30 control the value or magnitude of the driving and braking torque signals, respectively, via potentiometers 29 and 31 which are connected to an unshown source of electrical power.

The regenerative braking device 10 includes a housing 54 having a partition wall 54a dividing the housing into a chamber 54b containing a transmission assembly 56 and a chamber 54c containing an elastomeric energy storage assembly 58. Transmission assembly 56 includes a pinion gear 60 fixed for rotation with a shaft 62 which is rotatably supported by bearings 64 and 66, an input torque drive path 68, and an output torque drive path 70. Shaft 62 is drivingly connected to coupling 14 and provides a driven means, when viewed from the left in FIG. 2, which is driven clockwise by the drive train to effect a flow of energy into the energy storage assembly via path 68 and which is also driven clockwise by the storage assembly to effect a flow of energy into the drive train via path 70.

Path 68 includes a gear 72 in mesh with pinion 60 and fixed for rotation with a shaft 74 rotatably supported by bearings 76 and 78, a shaft 80 supported by a bearing 82, and a clutch assembly 84 operative when actuated to drivingly interconnect shafts 74 and 80. Clutch assembly 84, which is schematically shown herein, may be any of several well known types. Herein the clutch assembly includes a clutch member 86 fixed for rotation with shaft 80, a clutch member 88 slidably splined to shaft 74, a shifter fork 90, a spring 92 for biasing member 88 out of engagement with member 86, and an electromagnetic coil 94 operative when energized by lead 46 to move member 88 into engagement with member 86, thereby actuating the clutch assembly for effecting a flow of energy from the vehicle drive train into the energy storage assembly.

Path 70 includes a gear 96 in mesh with pinion 60 and fixed for rotation with a shaft 98 rotatably supported by bearings 100 and 102, a shaft 104 rotatably supported by a bearing 106, two one-way clutches 108 and 110, an intermediate shaft 112, and a brake assembly 114 operative when actuated to a released position to effect a flow of energy from the energy storage assembly into the vehicle drive train. When viewed from the left in FIG. 2, one-way clutch 108 allows counterclockwise rotation of shaft 98 relative to shaft 112 and one-way clutch 110 allows clockwise rotation of shaft 104 relative to shaft 112. One-way clutch 108 and 110 and brake assembly 114, which are schematically shown herein, may be any of several well known types. Herein, one-way clutch 108 includes a ratchet toothed clutch member 116 fixed to shaft 98 and a ratchet toothed clutch member 118 slidably splined to intermediate shaft 112 and biased toward member 116 by an unshown spring. One-way clutch 110, in a like manner, includes a ratchet toothed clutch member 120 fixed to shaft 104, a ratchet toothed clutch member 122 slidably splined to intermediate shaft 112 and biased toward member 120 by an unshown spring. Brake assembly 114 includes a band brake member 124 which grips intermediate shaft 112, an actuating arm 126, a spring 128 for biasing band brake member into engagement with the intermediate shaft, and an electromagnetic coil 130 operative when energized by lead 48 to actuate the band brake member to the released position.

Energy storage assembly 58 includes a gear 132 fixed for rotation with shaft 80, a cylindrical rubber bar 134 bonded at one end to gear 132 and at the other end to a plate 136 which is fixed to housing 54 via screws 138, a gear 140 fixed for rotation with shaft 104 and in mesh with gear 132, a cylindrical rubber bar 142 bonded at one end to gear 140 and at the other end to a plate 144 which is fixed to housing 54 by screws 146. Assembly 58 further includes a torsion level transducer, herein in the form of a potentiometer 147 operative to provide a positive analog signal which increases in proportion to increasing amounts of torsional stress or energy stored in the rubber bars. Potentiometer 147 includes a circular resistor element 148 secured to housing 54 via unshown fasteners and a wiper element 150 secured to rubber bar 134. Wiper element 150 rotates relative to resistor element 148 as the torsional stress in rubber bar 134 varies. Resistor element 148 is connected to an unshown source of electrical power and wiper element 150 is connected to control 32 via lead 42.

In the absence of signals to actuate clutch assembly 84 to the applied position or to actuate brake assembly 114 to the released position, the energy storage assembly is in a free wheeling mode, i.e., the storage assembly is drivingly disconnected from shaft 62 whether the vehicle is moving or not moving. Hence, no energy can flow to or from the storage assembly via the input and output paths 68 and 70, i.e., whatever energy is in the storage assembly is locked therein. Whenever the vehicle is in motion, shaft 62 rotates clockwise, thereby effecting a counterclockwise rotation of clutch members 88 and 116 in paths 68 and 70, respectively. The teeth of clutch member 116 ratchet over the teeth of clutch member 118 when the brake assembly is engaged and the vehicle is in motion. When the vehicle is in motion and clutch 84 is actuated in response to a braking torque signal, shaft 80 rotates gear 132 counterclockwise and gear 132 in turn rotates gear 140 clockwise, whereby cylindrical rubber bars 134 and 142 are torsionally stressed in the direction of rotation of their respective gears. Such torsional stressing provides a braking torque for stopping the vehicle and converts kinetic energy, due to motion of the vehicle, into stored potential energy in the rubber bars. When the vehicle is not in motion or is to be accelerated and brake 114 is actuated to the released position in response to a driving torque signal, the torsional stress in rubber bars 134 and 142 effects a counterclockwise rotation of shaft 104, clutch 110, shaft 112, clutch 108, shaft 98, and gear 96, thereby rotating gear 60 and shaft 62 clockwise to effect a flow of energy to the vehicle via drive train 16.

Referring now to FIG. 3, control 32 includes a summer 152 having a non-inverting terminal 152a and an inverting terminal 152b for receiving the driving and braking torque signals on leads 34 and 36. Summer 152 provides a signal on its output terminal 152c which is proportional to the difference in value between the signals from its input terminals. A positive signal from terminal 152c is a driving torque signal and a negative signal is a braking torque signal. Since the output of summer 152 is the difference between the input signals, it negates or prevents braking and driving torque signals from being simultaneously processed by the control. Driving and braking torque signals could be simultaneously applied to summer 152 if a vehicle operator were to ride the brake pedal while in a driving mode. Terminal 152c is connected to input terminals 154a and 156a of rectifiers 154 and 156 via leads 158 and 160. When the signal on terminal 154a is positive, rectifier 154 provides a positive signal on its output terminal 154b equal or proportional to the value of the input signal thereto. When the signal on terminal 154a is negative, the signal on output terminal 154b is zero. Hence, rectifier 154 passes the driving torque signal and blocks the braking torque signal. When the signal on terminal 156a is negative, rectifier 156 provides a positive signal on its output terminal 156b equal to or proportional to the absolute value of the negative input signal thereto. When the signal on terminal 156a is positive, the signal on output terminal 156b is zero. Hence, rectifier 156 passes and inverts the braking torque signal and blocks the driving torque signal.

The output signal on terminal 154b is connected to a non-inverting terminal 162a of a summer 162 via a lead 164, to an input terminal 166a of a comparator 166 via a lead 168, and to an input terminal 170a of a summer 170 via a lead 172. Summer 162 includes an inverting terminal 162b for receiving the torsion level signal from transducer 147 via lead 42, a lead 174, a solenoid switch 178, and a lead 180. Solenoid switch 178 is biased normally open by a spring 181 and is closed by a coil 182 when the torsion level signal is above a predetermined minimum. A torsion level signal less than the predetermined minimum indicates that the torsional stress or energy in the storage assembly is too low to provide a torque which is effective to drive the vehicle. Coil 182 is connected at one end to ground and at the other end to an output terminal 183a of a power amplifier 183 via a lead 184. Amplifier 183 is in turn connected at its input terminal 183b to an output terminal 186a of a comparator 186 via a lead 185. Comparator 186 includes an input terminal 186b connected to the torsion level signal on lead 42 via leads 188 and 190 and a reference terminal 186c connected to a minimum torsion level reference signal via a lead 192. Comparator 186 produces a logical high signal on output terminal 186a when the torsion level signal on terminal 186b is greater than the minimum torsion level reference signal on reference terminal 186c and a logical low otherwise. Amplifier 183 conducts through coil 182 when the signal on input terminal 183b is high, thereby producing a magnetic force for closing the switch and connecting the torsion level signal with terminal 162b of summer 162. Summer 162, which receives only positive signals from leads 164 and 180, provides a signal on its output terminal 162c proportional to the difference between the signals from its input terminals. When the driving torque signal on lead 164 is greater than the torsion signal on lead 180, the signal on output terminal 162c is positive and proportional to the difference between the torque demanded by the value of the driving torque signal and the torque which can be supplied by the energy storage assembly. Such a condition arises when the vehicle operator demands a torque for accelerating the vehicle faster than can be accommodated by even a fully charged energy storage assembly or as the energy level in the storage assembly depletes. This latter condition may arise during vehicle acceleration or after the vehicle has obtained a terminal velocity. When the torsion signal on lead 180 is greater than the signal on lead 164, the signal on terminal 162c is negative. When the torsion level signal falls below the predetermined minimum level, solenoid switch 178 opens and summer 163 produces an output signal proportional to the driving torque signal on terminal 162a. Terminal 162c is connected to an input terminal 192a of a rectifier 192 via a lead 194. When the signal on terminal 192a is positive, rectifier 192 produces a signal on its output terminal 192b which is positive and proportional to the input signal. When the signal on terminal 192a is negative, the signal on terminal 192b is zero. Hence, the rectifier passes positive signals and blocks negative signals. The signal on terminal 192b is connected to a prime mover control (not shown) via lead 50. The signal activates the prime mover and the value of the signal regulates the torque output of the prime mover. When energy is available from the energy storage assembly, i.e., the torsion signal is above the predetermined minimum, the signal on terminal 192b regulates the prime mover so that the sum of the torque from the energy storage assembly and the prime mover equals the torque demanded by the driving torque signal. When energy is no longer available from the energy storage assembly, the signal on terminal 192b will equal the driving torque signal and increase the prime mover torque to the value demanded by the driving torque signal.

Returning now to comparator 166 and summer 170, comparator 166 provides a logical high signal on its output terminal 166b when the signal on its input terminal 166a is greater than a zero reference signal on an input terminal 166c. The output signal on terminal 166b is connected via a lead 196 to an input terminal 189a of an AND gate 198. When a driving torque signal is applied to input terminal 170a, summer 170 provides a positive signal on its output terminal 170b proportional to the input signal on input terminal 170a. The output signal on terminal 170b is connected to an input terminal 200a of a variable pulse width generator 200 via a lead 202. Generator 200 provides on its output terminal 200b a square wave signal having a duty cycle proportional to the value of the signal on its input terminal and therefore in proportion to the torque demanded by the driving torque signal. The output signal on terminal 200b is connected via a lead 204 to an input terminal 198b of gate 198. The signal produced by generator 200 is either a positive logical high or a logical low.

AND gate 198 also includes an input terminal 198c connected to the output terminal 186a of comparator 186 via a lead 205. Comparator 186, as previously mentioned, is connected at its input terminals to the torsion level signal from the storage assembly and to a minimum torsion level reference signal. The comparator produces a logical high signal on its output terminal when the torsion level signal is greater than the minimum torsion level signal and a logical low otherwise. Gate 198 produces a positive or logical high signal on its output terminal 198d when the signals on input terminals 198a, 198b, and 198c are each high. The output is a logical low when any one of the input signals is low. The signal on terminal 198a is high when a driving torque signal is being produced by accelerator pedal 28. The signal on terminal 198b is cyclically high for a period of time proportional to the driving torque demanded by the value of the driving torque signal. And, the signal on terminal 198c is high when the torsion level signal on terminal 186a of comparator 186 is greater than the minimum torsion level signal on terminal 186c. Hence, gate 198 provides a signal having a positive duty cycle proportional to the torque demanded by the driving torque signal.

The output terminal 198d is connected to an input terminal 206a of a power amplifier 206 via a lead 208. The amplifier output terminal 206b is connected to coil 130 of brake assembly 114 via lead 48. The amplifier conducts and energizes coil 130 to release the brake assembly when the input signal on terminal 206a is high and ceases to conduct when the input signal is low, thereby modulating the brake assembly duty cycle or release time to control the average torque output from the storage assembly to the vehicle drive train in proportion to the driving torque signal provided by the accelerator pedal.

Referring now to rectifier 156, the positive braking torque signal produced on output terminal 156b is connected to a non-inverting terminal 210a of a summer 210 via a lead 212, an input terminal 214a of a comparator 214 via a lead 216, and to an input terminal 170c of summer 170 via a lead 218. Summer 210 includes an inverting terminal 210b for receiving the torsion level signal from transducer 147 via lead 42, a lead 220, a solenoid switch 222, and a lead 224. Solenoid switch 222 is biased normally open by a spring 225 and is closed by a coil 226 when the torsion level signal is less than a predetermined maximum. A torsion level signal less than the predetermined maximum indicates that the torsional stress or energy in the storage assembly is less than what the storage assembly can accommodate and that the storage assembly is therefore available for vehicle braking. Coil 226 is connected at one end to ground and at the other end to an output terminal 227a of a power amplifier 227 via a lead 228. Amplifier 227 is in turn connected at its input terminal 227b to an output terminal 230a of a comparator 230 via a lead 231. Comparator 230 includes an input terminal 230b connected to the torsion level signal on lead 42 via leads 188 and 232 and a reference terminal 230c connected to a maximum torsion level reference signal via a lead 234. Comparator 230 produces a logical high signal on output terminal 230a when the torsion level signal on terminal 230b is less than the maximum torsion level reference signal on reference terminal 230c and a logical high otherwise. Amplifier 227 conducts through coil 226 when the signal on input terminal 227b is high, thereby producing a magnetic force for closing the switch and connecting the torsion level signal with terminal 210b of summer 210. Summer 210, which receives only positive signals from leads 212 and 224, provides a signal on its output terminal 210c proportional to the difference between the signals on its input terminals. When the braking torque signal on lead 212 is greater than the torsion level signal on lead 224, the signal on output terminal 210c is positive and proportional to the difference between the braking torque demanded by the value of the braking torque signal and the braking torque which can be supplied by the energy storage assembly. Such a condition arises when the vehicle operator demands a torque for decelerating the vehicle faster than can be accommodated by the energy storage assembly. When the signal on lead 224 is greater than the signal on lead 212, the signal on terminal 210c is negative. When the torsion level signal increases above the predetermined maximum level, solenoid switch 222 opens and summer 210 produces an output signal proportional to the braking torque signal on terminal 210a. Terminal 210c is connected to an input terminal 238a of a rectifier 238 via a lead 240. When the signal on terminal 238a is positive, rectifier 238 produces a signal on its output terminal 238b which is positive and proportional to the input signal. When the signal on terminal 238a is negative, the signal on terminal 238b is zero. Hence, the rectifier passes positive signals and blocks negative signals. The signal on terminal 238b is connected to a vehicle brake control (not shown) via the lead 52. The signal energizes the vehicle wheel brakes and the value of the signal regulates the braking torque provided by the wheel brakes. When the energy storage assembly is providing part of the vehicle braking, the signal on terminal 238b regulates the wheel brakes so that the sum of the braking torque from the storage assembly and the wheel brakes equals the torque demanded by the braking torque signal. When the storage assembly is no longer available to provide braking, due to the energy stored in the storage assembly being at the maximum, the signal on terminal 238b will equal the braking torque signal and increase the wheel brake torque to the value demanded by the braking torque signal.

Returning now to comparator 214 and summer 170, comparator 214 provides a logical high signal on its output terminal 214b when the signal on its input terminal 214a is greater than a zero reference signal on an input terminal 214c. The output signal on terminal 214b is connected via a lead 242 to an input terminal 244a of an AND gate 244. When a braking torque signal is applied to input terminal 170c, summer 170 provides a positive signal on its output terminal 170b proportional to the input signal on input terminal 170c. The output signal on terminal 170b is connected to the input of the variable pulse width generator 200. Generator 200, in a manner previously described in connection with the driving torque signal, provides on its output terminal 200b a square wave signal having a positive duty cycle proportional to the value of the braking torque signal on its input terminal. The output signal on terminal 200b is connected via a lead 246 to an input terminal 244b of gate 244. The signal produced by generator 200 is either a positive logical high or a logical low.

AND gate 244 also includes input terminals 244c and 244d. Terminal 244c is connected to the output terminal 230a of comparator 230 via a lead 248. Comparator 230, as previously mentioned, is connected at its input terminals to the torsion level signal from the storage assembly and to a maximum torsion level reference signal. The comparator produces a logical high signal on its output terminal when the torsion level signal is less than the maximum torsion level signal on the reference terminal and a logical low otherwise. Terminal 244d is connected to an output terminal 250a of a comparator 250 via a lead 252. Comparator 250 includes an input terminal 250b connected to the vehicle speed signal on lead 38 and a reference terminal 250c connected to a minimum speed level reference signal via a lead 254. The minimum speed reference level signal may represent a zero vehicle speed or a somewhat greater speed. When the signal on terminal 250b is greater than the reference signal on terminal 250c, comparator 250 produces a logical high signal on output terminal 250a and a logical low signal otherwise.

Gate 244 produces a logical high signal on its output terminal 244e when the signals on input terminals 244a, 244b, 244c, and 244d are each high. The output is a logical low when any one of the input signals is low. The signal on terminal 244a is high when a braking torque signal is being produced by the brake pedal. The signal on terminal 244b is cyclically high for a period of time proportional to the braking torque demanded by the value of the braking torque signal. The signal on terminal 244c is high when the torsion level in the storage assembly is below the predetermined maximum. And the signal on terminal 244d is high when the vehicle speed is greater than the predetermined minimum. Hence, gate 244 produces a signal having a positive duty cycle proportional to the braking torque demanded by the braking torque signal.

The output terminal 244e is connected to an input terminal 256a of a power amplifier 256 via a lead 258. The amplifier output terminal 256b is connected to coil 94 of clutch assembly 84 via lead 46. The amplifier conducts and energizes coil 94 to actuate the clutch assembly when the input signal on terminal 256a is high and ceases to conduct when the input signal is low, thereby modulating the clutch assembly duty cycle or actuation time to control the average braking torque provided by the storage assembly in proportion to the braking torque signal provided by the brake pedal.

The preferred embodiment of the invention has been disclosed for illustrative purposes. Many variations and modifications of the preferred embodiment are believed to be within the spirit of the invention. For example, the torsion level transducer 147 may be replaced by minimum and maximum torsion level limit switches which may be connected, respectively, to terminals 198c and 244c of the AND gates. The minimum torsion level limit switch would provide a logical high signal to terminal 198c when the torsional stress or energy in the storage assembly is above a predetermined minimum and the maximum torsion level limit switch would provide a logical high signal to terminal 244c when the torsional stress or energy in the storage assembly is below a predetermined maximum. Further, a torque transducer may be installed on shaft 62 of the regenerative device 10 and the torque output signal from the torque transducer would be applied directly to summers 162 and 210. The summers 162 and 210 would then each produce an output signal which is the difference between the torque demanded and the actual torque provided by the storage assembly. The following claims are intended to cover the inventive portions of the preferred embodiment and the variations and modifications within the spirit of the invention.

What is claimed is:

1. A regenerative braking system adapted for installation in a machine including a driven means, a prime mover operative when activated by a driving torque signal to impart motion to the driven means, and brake means operative when activated by a braking torque signal to stop said driven means, said system comprising:

resilient means for converting kinetic energy from the motion of said driven means to potential energy in said resilient means and vice versa;

first means adapted for driving connection with said driven means and operative when actuated to effect a flow of energy from said driven means into said resilient means for applying a braking torque to said driven means independent of said brake means;

second means adapted for driving connection with said driven means and operative when actuated to effect a flow of energy from said resilient means to said driven means for applying a driving torque to said driven means independent of said prime mover; and control means adapted to receive said driving and braking torque signals, said control means operative in response to said braking torque signal to actuate said first means and operative in response to said driving torque signal to actuate said second means.

2. The control means of claim 1, further including:
means operative to regulate the actuation duty cycle of said second and first means in response to the values of said driving and braking torque signals for, respectively, governing the average driving and braking torque to said driven means by said resilient means.

3. The system of claim 1, wherein said resilient means is an elastomeric means.

4. The control means of claim 1, further including:
means operative to prevent activation of said brake means in response to a signal indicating the resilient means can provide the braking torque demanded by the braking torque signal and operative to activate said brake means in response to a signal indicating the resilient means cannot provide the braking torque demanded by the braking torque signal.

5. The control means of claim 4, further including:
means operative to activate said brake means in proportion to the difference between the braking torque demanded by said braking torque signal and the braking torque provided by said resilient means, whereby the sum of the braking torques provided by the resilient means and the brake means equals the braking torque demanded by the braking torque signal.

6. The control means of claim 1, further including:
means operative to prevent activation of said prime mover in response to a signal indicating the resilient means can provide the driving torque demanded by the driving torque signal and operative to activate said prime mover in response to a signal indicating the resilient means cannot provide the torque demanded by the driving torque signal.

7. The control means of claim 6, further including:
means operative to activate said prime mover in proportion to the difference between the driving torque demanded by said driving torque signal and the driving torque provided by said resilient means, whereby the sum of the driving torques provided by the resilient means and the prime mover equals the driving torque demanded by the driving torque signal.

8. The control means of claim 1, further including:
means for sensing a maximum storage of energy in the resilient means; and
means operative in response to said braking torque signal and said sensing to disable actuation of said first means and to effect activation of said brake means.

9. The control means of claim 1, further including:
means for sensing the speed of said driven means; and
means operative in response to said braking torque signal and a sensed speed of said driven means below a predetermined value to activate said brake means.

10. The control means of claim 9, further including:

means operative to disable actuation of said first means in response to said sensed speed below said predetermined value.

11. The control means of claim 1, further including:
means for sensing a minimum storage of energy in said resilient means; and
means operative in response to said driving torque signal and said sensing to effect activation of said prime mover.

12. The control means of claim 11, further including:
means operative to disable actuation of said second means in response to said sensed minimum storage.

13. The control means of claim 1, further including:
means operative in response to said control means simultaneously receiving both a braking torque and a driving torque signal to negate the lesser of said signals.

14. A regenerative braking system adapted for installation in a machine including means operative to impart kinetic energy to at least part of the machine, said system comprising:
drive means adapted to be drivingly connected to said part;
first means operative when actuated to effect a flow of said kinetic energy from said part to said drive means;
second means operative when actuated to effect a flow of energy from said drive means to said part; and
an elastomeric means including at least one elastomeric roller torsionally stressed in response to actuation of said first means to resiliently store said energy for effecting braking of said part and torsionally relaxed in response to actuation of said second means to resiliently drive said drive means with said stored energy for effecting acceleration of said part.

15. In a regenerative braking system adapted to be drivingly connected to a kinetically driven means; said system comprising drive means adapted for driving connection with said driven means, first means operative when actuated to effect a flow of energy from said driven means to said drive means, second means operative when actuated to effect a flow of energy from said drive means to said driven means, and energy storage means operative in response to actuation of said first means to store said energy for braking said driven means and operative in response to actuation of said second means to drive said driven means with said stored energy for accelerating said driven means; the improvement comprising:
means operative to control the actuation duty cycle of said first and second means for, respectively, governing the acceleration and braking rate of said driven means by said energy storage means.

16. A regenerative braking system adapted for installation in a vehicle including a plurality of ground engaging wheels, a prime mover operative to drive at least one of said wheels, and means operative to produce a driving torque signal and a braking torque signal, said system comprising:
drive means adapted to be drivingly connected to at least one of said wheels;
first means adapted to be actuated in response to said braking torque signal and operative when actuated to effect a flow of energy from said drive wheel connected to said drive means;
second means adapted to be actuated in response to said driving torque signal and operative when actuated to effect a flow of energy from said drive means to said wheel connected thereto; and
energy storage means including at least one elastomeric roller torsionally stressed in response to actuation of said first means to receive and store said energy for effecting braking of said vehicle and torsionally relaxed in response to actuation of said second means to transmit said stored energy for effecting acceleration of said vehicle.

17. A regenerative braking system adapted for installation in a vehicle including a plurality of ground engaging wheels, a prime mover operative to drive at least one of said wheels, and means operative to produce a driving torque signal and a braking torque signal, said system comprising:
energy storage means;
drive means adapted to be drivingly connected to at least one of said wheels;
first means operative when actuated to effect a power path from said drive means to said energy storage means for converting kinetic energy of said vehicle to potential energy in said storage means;
second means operative when actuated to effect a power path from said energy storage means to said drive means for converting said potential energy to kinetic energy in said vehicle; and
control means operative to regulate the actuation duty cycle of first and second means in response to the magnitude of said driving and braking torque signals for, respectively, governing the acceleration and braking rate of said vehicle.

18. The system of claim 17, wherein said vehicle includes at least one wheel brake and wherein said control means further includes:
means for sensing attainment of the maximum energy storage limit in said energy storage means; and
means operative in response to said braking torque signal and in response to said sensing of said limit to disable actuation of said first means and effect application of said wheel brake.

19. The system of claim 17, wherein said vehicle includes at least one wheel brake and wherein said control means further includes:
means operative in response to said braking torque signal in excess to the maximum braking rate of said energy storage means to effect actuation of said wheel brake.

20. The system of claim 17, wherein said vehicle includes at least one wheel brake and wherein said control means further includes:
means for sensing the speed of said vehicle; and
means operative to apply said wheel brake in response to said braking torque signal and a sensed vehicle speed less than a predetermined minimum.

21. The system of claim 17, wherein said control means further includes:
means operative in response to both said driving torque signal and said braking torque signal to negate the lesser of said signals.

22. A regenerative braking system adapted for installation in a machine including means operative to impart motion to at least part of the machine, said system comprising:
a first power path drivingly connected at one end to said part;

a second power path drivingly connected at one end to said part;

clutch means operative when actuated to effect a driving connection through said first power path;

brake means operative when released to effect a driving connection through said second power path; and an elastomeric means drivingly connected to the other ends of said first and second power paths, said elastomeric means operative when said clutch is actuated to resiliently store energy of motion of said part for braking said part, and said elastomeric means operative when said brake is released to resiliently drive said part with said stored energy for imparting motion to said part.

23. A regenerative braking system adapted for installation in a vehicle including a plurality of ground engaging wheels, a prime mover operative to drive at least one of said wheels, and means selectively operative to produce a vehicle acceleration signal and a vehicle braking signal, said system comprising:

first and second power paths which are each drivingly connected at one end to at least one of said wheels;

clutch means operative when actuated to effect a driving connection through said first path;

brake means operative when released to effect a driving connection through said second path;

energy storage means operative when said clutch is actuated to store energy of motion of said vehicle, and operative when said brake is released to drive said vehicle; and control means operative to regulate the duty cycle of said clutch actuation and said brake release in response to the magnitude of said acceleration and braking signals for, respectively, governing the acceleration and braking of said vehicle.

* * * * *